(12) United States Patent
Woodward et al.

(10) Patent No.: US 8,390,797 B2
(45) Date of Patent: Mar. 5, 2013

(54) ENHANCED OPTICAL TIME-DOMAIN REFLECTOMETER RESOLUTION USING DEPOLARIZATION OF LIGHT SOURCE

(75) Inventors: Sheryl Woodward, Holmdel, NJ (US); Jonathan Nagel, Brooklyn, NY (US); Lynn Nelson, Matawan, NJ (US)

(73) Assignee: AT & T Intellectual Property I, LP, Atlanta, GA (US)

( * ) Notice: Subject to any disclaimer, the term of this patent is extended or adjusted under 35 U.S.C. 154(b) by 588 days.

(21) Appl. No.: 12/640,547

(22) Filed: Dec. 17, 2009

(65) Prior Publication Data

US 2011/0149271 A1 Jun. 23, 2011

(51) Int. Cl.
*G01N 21/00* (2006.01)
*H04B 10/08* (2006.01)
*H04B 17/00* (2006.01)

(52) U.S. Cl. ............. 356/73.1; 398/13; 398/20; 398/21; 398/28

(58) Field of Classification Search ................... None
See application file for complete search history.

(56) References Cited

U.S. PATENT DOCUMENTS

| | | | | |
|---|---|---|---|---|
| 4,838,690 A | * | 6/1989 | Buckland et al. | 356/73.1 |
| 5,432,637 A | * | 7/1995 | Hakimi | 359/489.17 |
| 5,457,756 A | * | 10/1995 | Hartl et al. | 385/11 |
| 6,674,518 B1 | * | 1/2004 | Asher et al. | 356/73.1 |
| 2008/0123085 A1 | * | 5/2008 | Sikora et al. | 356/73.1 |
| 2010/0073667 A1 | * | 3/2010 | Cyr et al. | 356/73.1 |
| 2011/0149270 A1 | * | 6/2011 | Nagel et al. | 356/73.1 |
| 2012/0109570 A1 | * | 5/2012 | Nagel et al. | 702/130 |

OTHER PUBLICATIONS

Hartog, et al., "On the Theory of Backscattering in Single-Mode Optical Fibers", Journal of LightWave Technology, vol. LT-2, No. 2, Apr. 1984, pp. 76-82.
Nakazawa et al., "Measurement and Analysis on Polarization Properties of Backward Rayleigh Scattering for Single-Mode Optical Fibers", IEEE Journal of Quantum Electronics. vol. QE-17, No. 12, Dec. 1981, pp. 2326-2334.
Gold et al. "Determination of Structural Parameter Variations in Single-Mode Optical Fibres by Time-Domain Reflectometry", Electronic Letters, Jun. 10, 1982, vol. 18, No. 12, pp. 489-490.
Luna Technologies, Luna OFDR Data Sheet, Optical Frequency Domain Reflectometer, pp. 1-12, Rev. Jul. 2004.

\* cited by examiner

*Primary Examiner* — Gordon Stock, Jr.
(74) *Attorney, Agent, or Firm* — Fay Kaplun & Marcin, LLP

(57) ABSTRACT

Described herein are systems and methods for enhancing the resolution of an optical time-domain reflectometer ("OTDR"). One embodiment of the disclosure of this application is related to a device, comprising an optical measuring component collecting a first set of measurement data from a forward trace along an optical fiber with the optical measuring device using depolarized light, and a processing component calculating loss along the length of fiber. The optical measuring device further collects a second set of measurement data from a backward trace along the optical fiber with the optical measuring device using depolarized light.

11 Claims, 6 Drawing Sheets

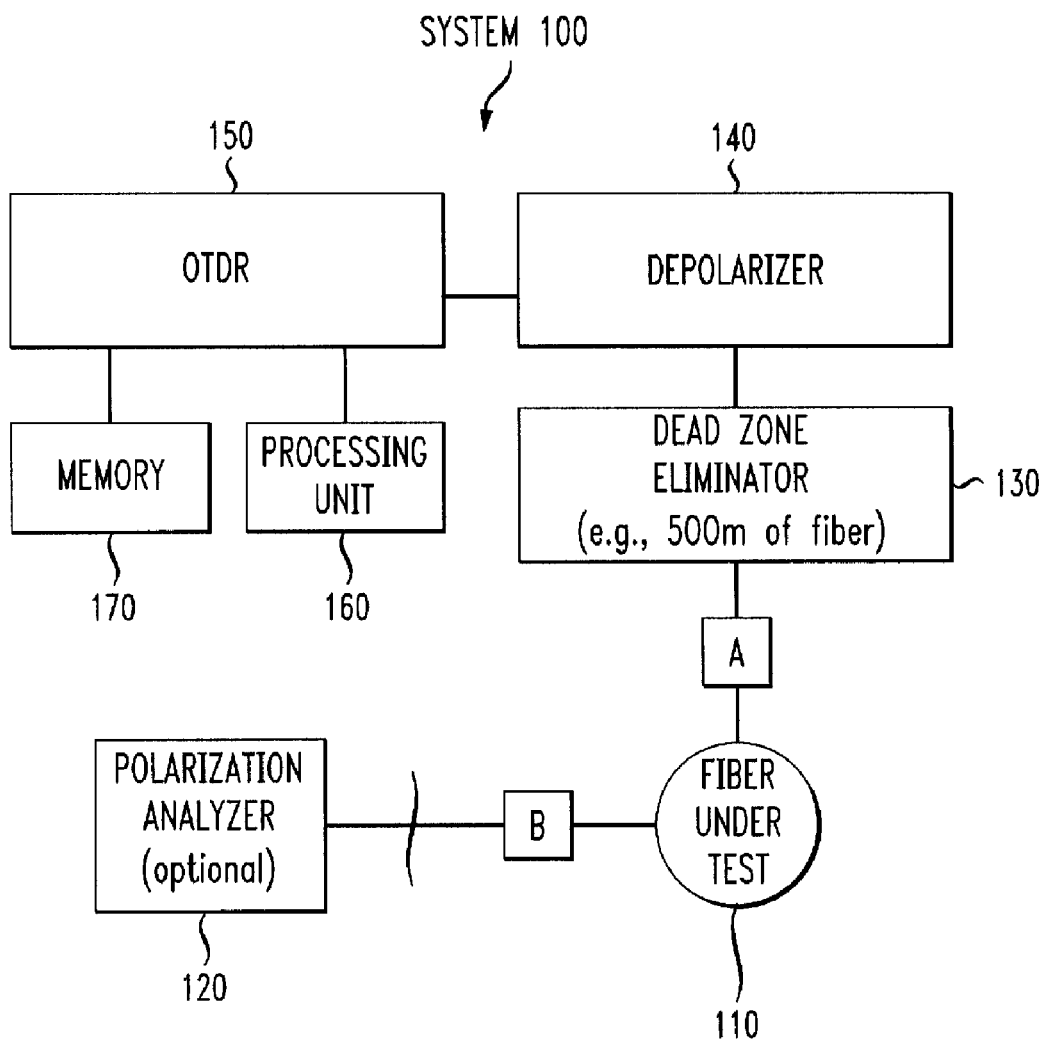

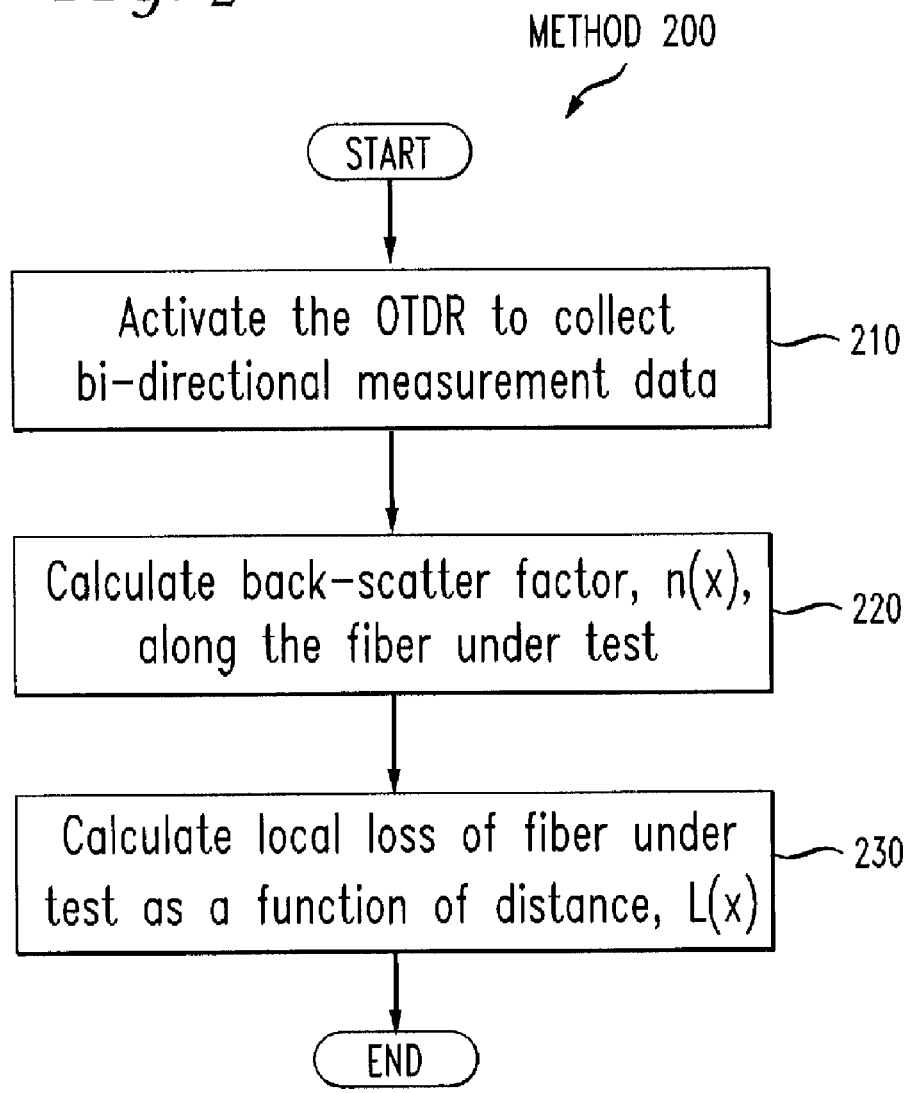

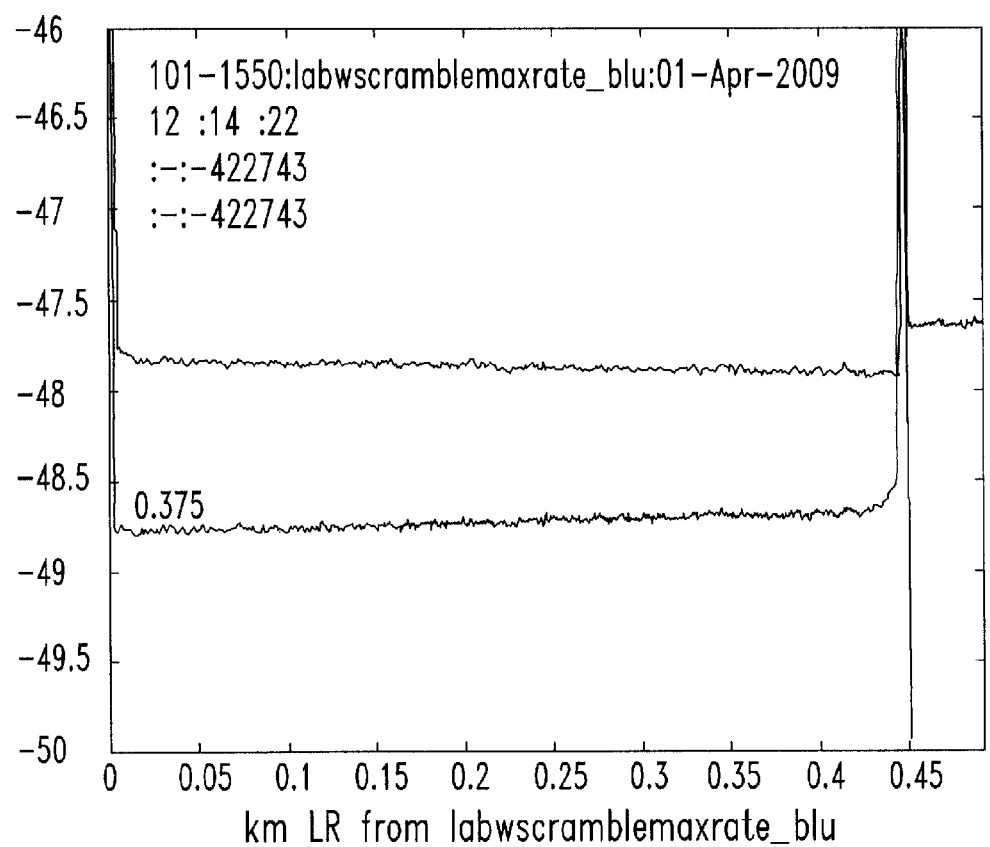

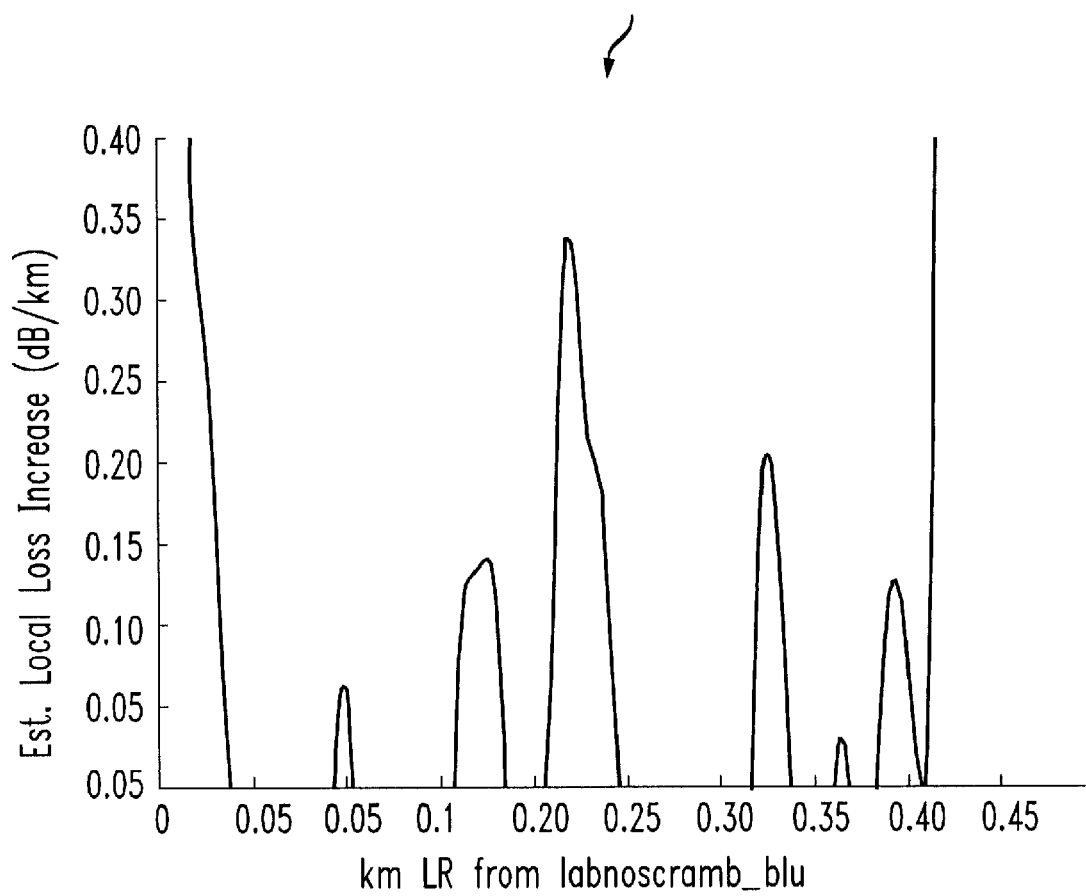

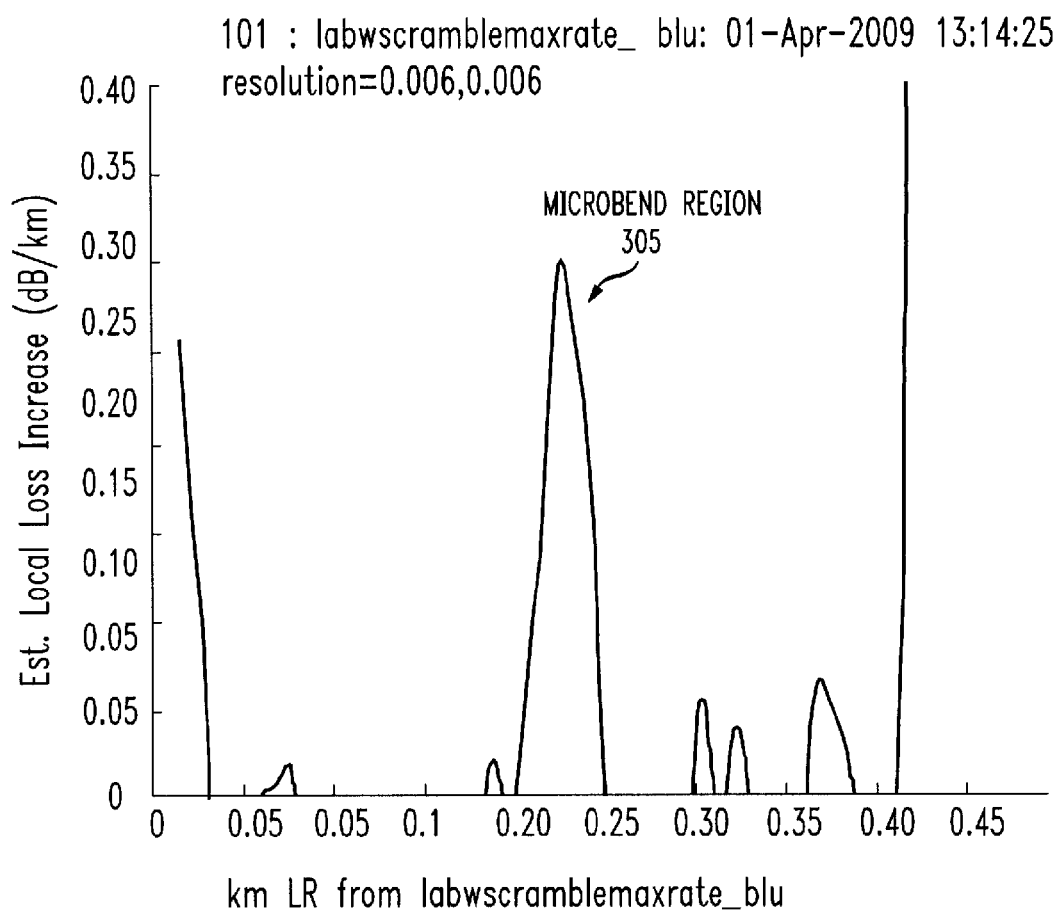

ENHANCED OPTICAL TIME-DOMAIN REFLECTOMETER RESOLUTION USING DEPOLARIZATION OF LIGHT SOURCE

BACKGROUND

An optical time-domain reflectometer ("OTDR") is an opto-electronic instrument used to characterize an optical fiber. A typical OTDR injects a series of optical pulses into the fiber during a testing process. From the same end of the fiber, the OTDR also extracts light that is scattered and reflected back from points in the fiber where the index of refraction changes. This process is equivalent to the manner in which an electronic time-domain reflectometer may measure reflections caused by changes in the impedance of the cable under test. Accordingly, the strength of the return pulses is measured and integrated as a function of time, and is plotted as a function of fiber length.

OTDRs have conventionally been standard equipment for the characterization of optical fiber. Specifically, it is well known that OTDRs may characterize the loss and length of an examined fiber during manufacture, during warehousing, during installation, and during splicing. OTDRs are also used in measuring optical return loss in the fiber, as well as locating faults in the fiber, such as breaks. Faults or failures in the fiber may be costly, in terms of repairing the fiber, as well as have adverse effects on service (e.g., disruption or loss of service). Any improvements in OTDRs have conventionally required the use of more sensitivity and more expensive devices and components. Specifically, improvements in sensitivity are typically achieved through launching more light into a test fiber and using OTDR detectors having less noise. While conventional OTDR devices may make adjustments in sensitivity to increase the range of the device, these adjustments do not improve the resolution limitations caused by polarization effects in the fiber.

SUMMARY OF THE INVENTION

Described herein are systems and methods for enhancing the resolution of an optical time-domain reflectometer ("OTDR"). One embodiment of the disclosure of this application is related to a device, comprising an optical measuring component collecting a first set of measurement data from a forward trace along an optical fiber with the optical measuring device using depolarized light, and a processing component calculating loss along the length of fiber. The optical measuring device further collects a second set of measurement data from a backward trace along the optical fiber with the optical measuring device using depolarized light A further embodiment of the disclosure of this application is related to a system comprising an optical measuring device collecting a first set of measurement data from a forward trace along an optical fiber, a depolarizer depolarizing light used in the optical measuring device, and a processor calculating loss along the length of fiber. The optical measuring device further collects a second set of measurement data from a backward trace along the optical fiber.

A further embodiment of the disclosure of this application is related to a method depolarizing, by a depolarizer, light used in an optical measuring device, collecting, by the optical measuring device, a first set of measurement data from a forward trace along an optical fiber with the optical measuring device using the depolarized light, and calculating loss along the length of fiber. The method further comprising collecting, by the optical measuring device, a second set of measurement data from a backward trace along the optical fiber with the optical measuring device using the depolarized light

BRIEF DESCRIPTION OF THE DRAWINGS

FIG. 1 shows an exemplary system for enhancing resolution of OTDR measurements using a depolarized light source according to an exemplary embodiment described herein.

FIG. 2 shows an exemplary method for enhancing resolution of OTDR measurements using a depolarized light source according to an exemplary embodiment described herein.

FIG. 3B shows a graph using depolarized measurements of the relative backscatter loss as a function of distance for the fiber according to the exemplary embodiments described herein.

FIG. 3C shows a graph using polarized measurements of the local loss as a function of distance for the fiber according to the exemplary embodiments described herein.

FIG. 3D shows a graph using depolarized measurements of local loss as a function of distance for the fiber 110 according to the exemplary embodiments described herein.

DETAILED DESCRIPTION

Figure 3A:
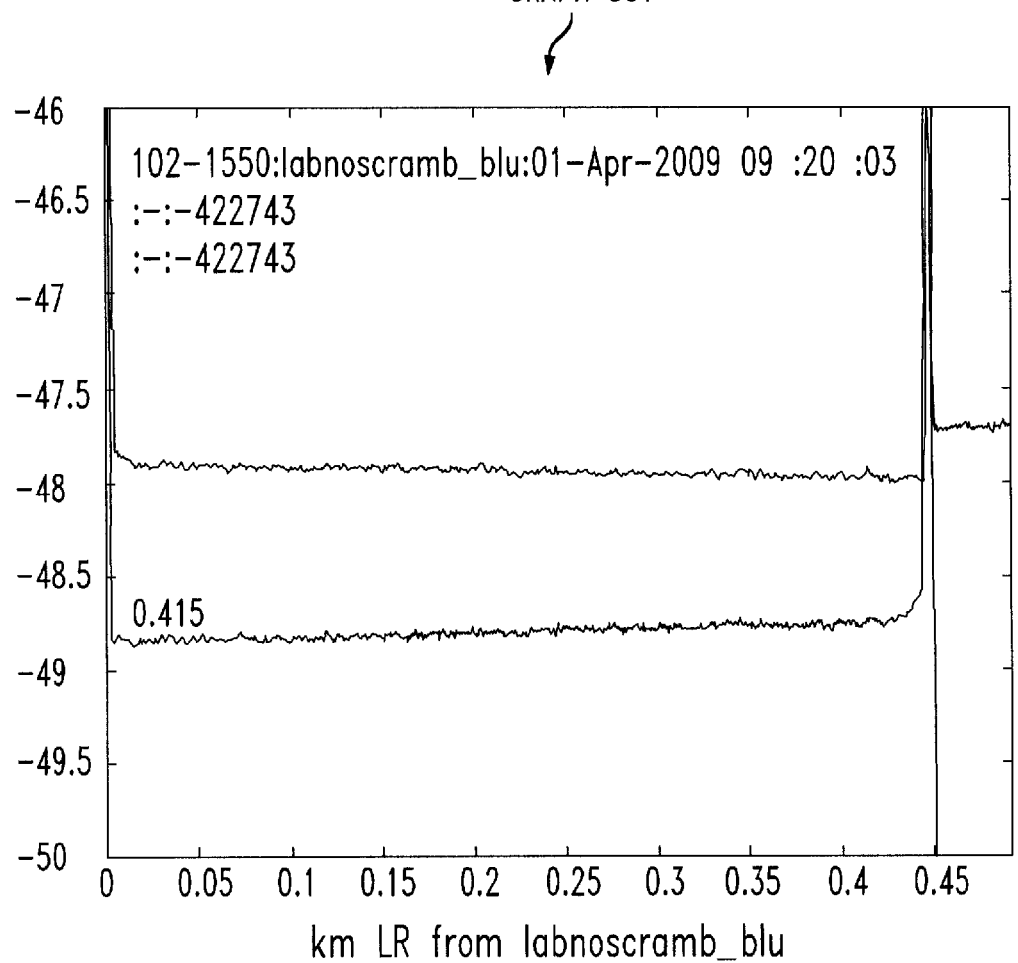
FIG. 3A shows a graph using polarized measurements of the relative backscatter loss as a function of distance for the fiber according to the exemplary embodiments described herein.

The exemplary embodiments may be further understood with reference to the following description and the related appended drawings, wherein like elements are provided with the same reference numerals. The exemplary embodiments are related to systems and methods for enhancing the resolution of an optical time-domain reflectometer ("OTDR"). An exemplary OTDR may be used to measure and analyze specific characteristics of an optical fiber under test, such as fiber loss. One of skill in the art would understand that fiber loss can impair the overall performance of an optical transmission system.

According to the exemplary embodiments described herein, exemplary systems and methods may allow for identification and repair of faults in the fiber under test. The systems and methods described herein may achieve improved resolution of an OTDR instrument by depolarizing light used by the OTDR. Specifically, this depolarized light may allow for enhanced detection of loss along the length of the fiber with better spatial resolution. For instance, the depolarized light may be achieved by using a light source that is unpolarized, or by transmitting a polarized light source through a depolarizing device, where such a device may be made with polarization maintaining fiber.

Polarization plays a role in areas of technology dealing with light wave propagation, such as fiber optics. It is understood that electromagnetic waves, such as light from a light source, will exhibit polarization. Specifically, polarization may refer to a property of light waves that describes the orientation of their oscillations. Accordingly, polarization of light is described by specifying the direction of the wave's electric field. When light travels in free space, it may propagate as a transverse wave (e.g., the polarization is perpendicular to the wave's direction of travel). In this case, the electric field may be oriented in a single direction (e.g., linear polarization), or it may rotate as the wave travels (e.g., circular or elliptical polarization). Some light sources, such as light bulbs, emit "unpolarized" light, wherein the orientation of the wave's electric field is random, and varies exceedingly rapidly. This may occur when the light source includes a large number of atoms or molecules that emit light, where the orientations of the electric fields produced by these emitters are not correlated.

Alternatively, polarized light may be depolarized by transmitting it splitting it into two polarizations (e.g., splitting vertically polarized light into two beams, each with a polarization at 45° to the vertical axis), delaying one of the resulting beams, and then recombining them. If the delay is chosen properly, then fluctuations in the optical phase will be converted into polarization fluctuations, and the resulting beam will be depolarized. This depolarization technique also can be achieved using a length of a polarization-maintaining fiber ("PMF"). The PMF is an optical fiber specifically manufactured to have two principal axes at right angles to one another. Light polarized along one principal axis will have a phase delay relative to light polarized along the second principal axis. If the polarization of the pulse and the principal axis of the PMF are not aligned (e.g., optimally, these two axes should be at 45° then the phase delay between the two components will cause output pulse from the PMF to be depolarized. The length of the PMF should be appropriately chosen so that the light output from the PMF is depolarized.

The depolarizers described above produce light with random polarization fluctuations, wherein the fluctuations are very rapid. This is in contrast to a polarization modulator (also known as a polarization scrambler), which produces polarization-modulated light. A polarization scrambler modulates the polarization of the output beam. Even if it is employing a random signal, the light is only depolarized on a time scale limited by the speed of the polarization scrambler. To enhance the resolution of an OTDR this time scale must be shorter than the duration of the optical pulses, so that within an optical pulse the light appears to be depolarized. Fast polarization scramblers are commercially available, but are expensive.

According to the exemplary embodiments described herein, a depolarizer (e.g., a PMF) may be described as an optical device used to depolarize light from a source, such that the polarization changes with time, and the polarization viewed at any instant in time has a random orientation. When averaging over a sufficient time interval, depolarized light exhibits all polarizations (e.g., linear, circular, elliptical, etc.).

According to an additional and/or alternative embodiment, the light source within the OTDR is designed to be depolarized (e.g., have a very low degree of polarization), without employing a separate depolarizer. This source might comprise an amplified spontaneous emission ("ASE") from an erbium doped fiber ("EDF") followed by an optical modulator. The EDF emits light, and the optical modulator is used to turn the light into short pulses that are transmitted down the fiber under test, as in standard OTDR.

It should be noted that a depolarized light source may be either a polarized or partially polarized light source followed by a depolarizer, or a light source that emits depolarized light. Furthermore, an exemplary light source may also be "naturally" depolarized light. For example, according to an alternative embodiment, pulses may be carved from an amplified ASE for the OTDR. Therefore, the exemplary depolarized light source may either be naturally depolarized light or a polarized/partially polarized light source with a depolarizer (e.g., a PMF).

As noted above, the exemplary OTDR may be used for characterizing and estimating a fiber's overall attenuation (e.g., splice losses, connector losses, etc.) along the length of the fiber. From a single OTDR trace, a user may see the level of back-reflected light as a function of distance down a fiber. The signal level is a function of both the fiber loss and the structure of the fiber.

In order to accurately characterize splice-loss, or other localized loss, using this technique, traces are taken from each end of an optical fiber using a bi-directional analysis. Bi-directional analyses may also be used to characterize local variations in both the structure and loss along the length of the fiber. Specifically, bi-directional traces may more accurately allow calculation of the loss and relative backscatter function along the length of the fiber than what is calculated using a single trace. The relative backscatter function depends on various characteristics of a fiber such as, but not limited to, the fiber's mode field diameter, doping concentration, Rayleigh scatter coefficient, core diameter, etc. However, the resolution of these measurements within conventional OTDR devices is limited due to the polarization effects in the fiber. As noted above, manufacturers typically improve the sensitivity of conventional OTDRs through decreasing the noise within the instrument, and hence allowing for a longer range. It is important to note that these conventional improvements do not improve the resolution limitations of OTDR measurements caused by the polarization effect.

FIG. 1 shows an exemplary system 100 for enhancing resolution of OTDR measurements using a depolarized light source according to an exemplary embodiment. The exemplary system 100 may include at least one fiber under test 110, a dead zone eliminator 130, a depolarizer 140, and an OTDR 150. The exemplary fiber under test 110 may connect to two locations within an optical network, such as locations "A" and "B". In our demonstration of this system, a center of the fiber under test 110 may be wrapped around a wire mesh (e.g., a trash bin) with an elastic bandage to induce microbends in the fiber 110.

Optionally, the exemplary polarization analyzer 120 may be used to confirm whether or not the light source from the OTDR 150 and depolarizer 140 are activated. It should be noted that the polarization analyzer 120 may be disconnected while traces are being performed by the OTDR 150. Traces from the OTDR 150 may be first taken at location "A" (e.g., a forward trace), and subsequently from location "B" (e.g., a backward trace) while the fiber 110 is connected to the dead zone eliminator 130 (e.g., 500 m of fiber). The dead zone eliminator 130 may place the fiber under test 110 well beyond the dead zone of the OTDR 150. As noted above, the use of the polarization analyzer 120 may be optional, and in no way is it intended to limit the scope of the systems and methods described herein. In other words, neither the presence nor use of the polarization analyzer 120 is required according to the exemplary embodiments of the system 100. Therefore, the polarization analyzer 120 may be removed from the system 100 without departing from the spirit the application.

According to the embodiments of the system 100, the exemplary depolarizer 140 (or depolarizing unit) may be any device capable of depolarizing an optical source. According to the exemplary embodiments of the system 100, the depolarizer 140 may be used in conjunction with the OTDR 150 to enhance the spatial resolution of the OTDR measurements. Specifically, the depolarizer 140 may effectively reduce the sensitivity of the OTDR 150 to polarizations affects. Accordingly, the exemplary system 100 may greatly improve the resolution of the OTDR 150 measurements (e.g., on the order from 60 m to 6 m).

Examples of the depolarizer 140 may include a length of polarization maintaining fiber. The length of polarization maintaining fiber may be a properly aligned strand of fiber, wherein proper alignment is not aligned with a principal axis.

It should be noted that while the depolarizer 140 is illustrated in FIG. 1 as being a separate component from the OTDR 150, it is not necessarily a separate component. In other words, the depolarizer may be integrated within the OTDR 150.

The exemplary OTDR 150 may include one or more detectors and may be in communication with a processing unit 160 (e.g., a processor, multiprocessor, CPU, a comparator, etc.) and a centralized data location or computer-readable storage medium, such as a memory 170. It should be noted that the processing unit 160 may perform a set of instructions related to the systems and methods described herein. Furthermore, the processing unit 160 may be in communication with the memory 170. Accordingly, each of the OTDR 150, the processing unit 160, and the memory 170 may be composed of various computer hardware or software components, or any combination thereof.

As will be described below, the processing unit 160 may enhance the sensitivity of the OTDR 150 and its detectors 150 by combining the bi-directional analysis of the OTDR 150 with the presence of the depolarized light source emitted from the output of the depolarizer 140. It should be noted that each of the processing unit 160 and the memory 170 may reside within the OTDR 150, itself. Alternatively, these components may reside in separate devices in communication with the OTDR 150. Furthermore, it should be noted that the system 100 is not limited to a particular set of components, and may include any number of components, either more or less than those illustrated in FIG. 1.

As noted above, the exemplary embodiments of the system 100 may improve the sensitivity of an optical time domain reflectometer, such as OTDR 150. These improvements may provide high-precision OTDR measurements without requiring any improvements or changes to the underlying configuration of the OTDR 150. Specifically, bi-directional measurements of the exemplary fiber 110 (e.g., fiber under test) may be combined with the depolarized spatial resolution in order to improve the sensitivity of the OTDR 150 while optimizing the analysis of all measured data related to the fiber 110, as well as to any additional fibers.

The accuracy of any bi-directional analysis may be limited by the sensitivity of the OTDR. Any inaccuracies may be most noticeable at either end of the tested fiber, wherein one of the two traces will have a poor signal-to-noise ratio ("SNR") due to the small amount of back-reflected light reaching a detector of the OTDR. As will be described in detail below, the usefulness of bi-directional analysis of local loss in a fiber will depend on the resolution of the measurement, and especially on the SNR of the traces.

It should be noted that the above-described embodiment includes the use of bi-directional analysis. This is not a requirement, as the depolarized light source 140 may be analyzed using single directional OTDR traces. A single OTDR trace may provide a user with a signal level of back-reflected light as a function of distance down a fiber. Specifically, the signal level may be a function of both the structure of the fiber and the fiber loss. However, by measuring bi-directional traces (e.g., traces originating at each end of the fiber) the effect of the varying fiber structure may be eliminated, and the loss along the length of the fiber may then be calculated.

FIG. 2 shows an exemplary method 200 for enhancing the resolution of OTDR measurements using a depolarizer 140 according to an exemplary embodiment described herein. FIG. 2 will be described with references to the various components of system 100, as illustrated in FIG. 1.

In step 210 of the method 200, the OTDR 150 may be activated to collect OTDR measurements in a forward direction along the length of the fiber 110 (e.g., a forward trace). In step 250 of the method 200, the OTDR 150 may collect OTDR measurements in a backward direction along the length of the fiber 110 (e.g., a backward trace). The OTDR 150 may measure signal levels of back-reflected light as a function of distance down the fiber under test 110. Accordingly, the signal levels may be a function of both the fiber structure of the fiber 110 and the local loss along the fiber 110.

In step 220 of the method 200, the OTDR 150 may calculate relative backscatter, $\eta(x)$, along the length of the fiber under test 110.

For instance, the following equation for computing the relative backscatter $\eta(x)$ from the forward and backward traces may be implemented within step 220:

$$\eta(x) = (10 \cdot \log_{10} T_{back} + 10 \cdot \log_{10} T_{forward})/2.$$

In step 230 of the method 200, the OTDR 150 may calculate local loss as a function of distance, $L(x)$, along the fiber under test 110. For instance, the following equation for differentiating the difference of the forward and backward traces may be implemented within step 260:

$$L(x) = \partial/\partial x (10 \cdot \log_{10} T_{back} - 10 \cdot \log_{10} T_{forward})/2$$

According to this equation, $L(x)$ may be the loss as a function of distance along the fiber 110 in units of dB/km, while $T_{back}$ and $T_{forward}$ may be the forward and backward OTDR traces in linear units. The local loss $L(x)$ may be useful for locating and identifying problems with the installed fiber 110.

An error in the $L(x)$ will increase with the noise in the data (i.e. as the data becomes more noisy). Specifically, the total energy launched into the fiber 110 will decrease as the pulsewidth decreases. Accordingly, finer resolution traces may result in greater noise in the traces. Furthermore, the OTDR traces may have a lower SNR for the portions of the traces when the roundtrip distance for the light to travel during a trace is at its greatest. Therefore, $T_{back}$ is noisier as x approaches zero (e.g., noisiest when x=0), and $T_{forward}$ is noisier as x approaches L (e.g., noisiest when x=L). As a result, $L(x)$ may not be as well determined near the ends of the fiber 110 (e.g., x=0 and x=L) as it is near the center of the fiber 110.

As noted above, the local loss measurement calculations may be useful in identifying and locating problems with the fiber under test 110. The usefulness of these measurements depends on the resolution of the data collected by the OTDR 150. This is especially true for the calculated loss of the traces since differentiation is used. Accordingly, any improvements and/or enhancements to the resolution of the OTDR 150 will result in improved OTDR calculations. As detailed in the above embodiments, depolarizing the light used in the OTDR 150 will improve the noise and resolution of loss versus distance.

The exemplary embodiments described herein enable a user (e.g., a technician) to more accurately measure the loss along the length of the fiber under test 110. Accordingly, this may improve fault location, as the user will be capable of quickly pinpointing where from the excess loss is originating. For example, if a strain-relief fixture is tightened too strongly at a particular telephone pole, the exemplary embodiment enables the user to efficiently identify which pole is the source of the problem. This ability may become increasing valuable as fiber is deployed closer to the home, thereby greatly increasing the number of fiber miles deployed within a network.

In addition to improving fault location, the exemplary embodiments may enable the user to detect whether or not a cable has been tampered with. Accordingly, this ability to check for a change in loss may enhance network security for the more sensitive customers of a service provider.

FIG. 3A shows a graph 301 using polarized measurements of the relative backscatter loss as a function of distance for the fiber 110. A small section of the fiber under test in this example was wound around a metal mesh so as to induce microbend loss in that section of the fiber. Specifically, FIG. 3A shows bi-directional traces (taken from each end of the fiber 110) without polarization scrambling taken along a 440 m test section of the fiber 110. As depicted in graph 301, the function is noisy (e.g., small fluctuations can be seen within the measured data) during each of the traces. In other words, without polarization scrambling, there is no compensation for polarization interference effects during the forward and backward traces.

FIG. 3B shows a graph 302 using polarization scrambled measurements of the relative backscatter loss as a function of distance for the fiber 110. Specifically, FIG. 3B shows polarization-scrambled, bi-directional traces taken along the same length of fiber illustrated in graph 301 of FIG. 3A. An Agilent polarization scrambler was used to polarization scramble the light used in taking this data. In order to achieve this level of performance, fast scrambling was necessary (this data was taken with at the instruments maximum scrambling rate, which was approximately 20,000 radians/sec). Slower scrambling was less effective, and noise and distortion were still visible. According to the example illustrated in graph 301, the pulse width used was 30 ns, yielding a resolution of 6 m. As depicted in graph 302, the function is less noisy, and slightly smoother than the traces of graph 301. Accordingly, the polarization scrambling may compensate for polarization interference effects during the forward and backward traces.

FIG. 3C shows a graph 303 using polarized measurements of the local loss, L(x), as a function of distance for the fiber 110 according to the exemplary embodiments described herein. Specifically, FIG. 3C shows local loss distribution without polarized scrambling taken along a test section of the fiber 110 at 1550 nm and at 1625 nm. The small excess loss (e.g., less than 0.01 dB) incurred by the microbends is obscured by noise and distortion in the data. As depicted in graph 303, the function is noisy and distorted during each of the traces (there are relatively large fluctuations in the calculated loss, and the peak loss calculated using data taken with a 1550 nm source is not at the same location as the loss calculated using the data taken at the 1625 nm source). As noted above, without polarization scrambling, there is no compensation for polarization interference effects when evaluating OTDR traces taken from each end of the test fiber 110.

FIG. 3D shows a graph 304 using depolarized measurements of local loss as a function of distance for the fiber 110 according to the exemplary embodiments described herein. Specifically, FIG. 3D shows local loss distribution with polarization scrambling taken along a test section of the fiber 110 at 1550 nm and at 1625 nm. As depicted in graph 304, the function is less noisy, and slightly smoother than the traces of graph 303. Accordingly, the depolarization may significantly reduce polarization interference effects when evaluating OTDR traces taken from each end of the test fiber 110. Furthermore, the smoothed curve of graph 304 may allow the user to accurately pinpoint a location of a microbend region 305 of the fiber 110. Specifically, the removal of noise caused by polarization effects allows the user to distinguish the microbend region 305 from any other local loss increases along the length of the fiber 110.

It will be apparent to those skilled in the art that various modifications may be made in the described embodiments, without departing from the spirit or the scope of the application. Thus, it is intended that the present disclosure covers modifications and variations of this application provided they come within the scope of the appended claims and their equivalents.

What is claimed is:

1. A device, comprising:
an optical measuring component collecting a first set of measurement data from a forward trace along an optical fiber with the optical measuring device using depolarized light and a second set of measurement data from a backward trace along the optical fiber using depolarized light; and
a processing component calculating loss L(x) along the length of fiber based on the first set of measurement data and the second set of measurement data by:

$$L(x)=\partial/\partial x(10 \cdot \log_{10} T_{back} - 10 \cdot \log_{10} T_{forward})/2,$$

wherein $T_{forward}$ is the first set of measurement data from the forward trace and $T_{back}$ is the second set of measurement data from the backward trace.

2. The device according to claim 1, wherein the optical measuring component is an optical time-domain reflectometer.

3. The device according to claim 1 wherein the depolarized light is generated by amplified spontaneous emission.

4. The device according to claim 1, wherein a depolarizer depolarizes light used in the optical measuring component.

5. The device according to claim 4, wherein the depolarizer is a polarization maintaining fiber.

6. A system, comprising:
an optical measuring device collecting a first set of measurement data from a forward trace along an optical fiber and further collecting a second set of measurement data from a backward trace along the optical fiber;
a depolarizer depolarizing light used in the optical measuring device; and
a processor calculating loss L(x) along the length of fiber based on the first set of measurement data and the second set of measurement data, wherein the loss along the length of the fiber is calculated by:

$$L(x)=\partial/\partial x(10 \cdot \log_{10} T_{back} - 10 \cdot \log_{10} T_{forward})/2,$$

wherein $T_{forward}$ is the first set of measurement data from the forward trace and $T_{back}$ is the second set of measurement data from the backward trace.

7. The system according to claim 6, wherein the optical measuring device is an optical time-domain reflectometer.

8. The system according to claim 6, wherein the depolarizer is a polarization maintaining fiber.

9. A method, comprising:
depolarizing, by a depolarizer, light used in an optical measuring device;
collecting, by the optical measuring device, a first set of measurement data from a forward trace along an optical fiber with the optical measuring device using the depolarized light;
collecting, by the optical measurement device, a second set of measurement data from a backward trace along the optical fiber with the optical measurement device using the depolarized light; and
calculating loss L(x) along the length of fiber based on the first set of measurement data, wherein the loss along the length of the fiber is calculated by:

$$L(x)=\partial/\partial x(10 \cdot \log_{10} T_{back} - 10 \cdot \log_{10} T_{forward})/2,$$

wherein $T_{forward}$ is the first set of measurement data from the forward trace and $T_{back}$ is the second set of measurement data from the backward trace.

10. The method according to claim 9, wherein the optical measuring device is an optical time-domain reflectometer.

11. The method according to claim 9, wherein the depolarizer is a polarization maintaining fiber.

* * * * *